US008239327B2

(12) United States Patent
Healy et al.

(10) Patent No.: US 8,239,327 B2
(45) Date of Patent: Aug. 7, 2012

(54) SYSTEM AND METHOD FOR USER LOGGING OF AUDIO AND VIDEO BROADCAST CONTENT

(75) Inventors: Tom Healy, Lakeville, MN (US); Norton Lam, Shoreview, MN (US); John Freund, Eagan, MN (US); Jason Deruyck, Farmington, MN (US)

(73) Assignee: Jump Technologies, Inc., Eagan, MN (US)

( * ) Notice: Subject to any disclaimer, the term of this patent is extended or adjusted under 35 U.S.C. 154(b) by 432 days.

(21) Appl. No.: 11/555,347

(22) Filed: Nov. 1, 2006

(65) Prior Publication Data
US 2007/0100766 A1 May 3, 2007

Related U.S. Application Data

(60) Provisional application No. 60/732,153, filed on Nov. 2, 2005.

(51) Int. Cl.
*G06F 21/00* (2006.01)
*G06Q 30/00* (2012.01)

(52) U.S. Cl. .................. 705/51; 705/902; 705/14.23

(58) Field of Classification Search .............. 705/51, 705/902, 14.23
See application file for complete search history.

(56) References Cited

U.S. PATENT DOCUMENTS

| 5,097,469 A * | 3/1992 | Douglas .............. 714/712 |
| 5,539,635 A * | 7/1996 | Larson, Jr. ............ 700/234 |
| 5,661,787 A * | 8/1997 | Pocock ............... 379/101.01 |
| 5,933,811 A * | 8/1999 | Angles et al. ............ 705/14 |
| 6,223,291 B1 * | 4/2001 | Puhl et al. .............. 726/28 |
| 6,226,618 B1 * | 5/2001 | Downs et al. ............. 705/1 |
| 6,317,784 B1 * | 11/2001 | Mackintosh et al. ...... 709/219 |
| 7,055,166 B1 * | 5/2006 | Logan et al. ............. 725/32 |
| 7,574,451 B2 * | 8/2009 | Burges et al. .............. 1/1 |
| 7,680,819 B1 * | 3/2010 | Mellmer et al. .......... 707/783 |
| 7,711,564 B2 * | 5/2010 | Levy et al. ............. 704/270 |
| 7,788,684 B2 * | 8/2010 | Petrovic et al. .......... 725/18 |
| 2001/0032312 A1 * | 10/2001 | Runje et al. ............ 713/172 |
| 2001/0051996 A1 * | 12/2001 | Cooper et al. ........... 709/217 |
| 2002/0002039 A1 * | 1/2002 | Qureshey et al. .......... 455/344 |
| 2002/0083123 A1 * | 6/2002 | Freedman et al. ........ 709/203 |
| 2002/0107016 A1 * | 8/2002 | Hanley ................. 455/426 |
| 2002/0188746 A1 * | 12/2002 | Drosset et al. ........... 709/231 |
| 2003/0050815 A1 * | 3/2003 | Seigel et al. ............. 705/7 |

(Continued)

OTHER PUBLICATIONS

Harte, L., Introduction to Digital Rights Identifying, Tracking, Authorizing and Restriction Access to Digital Media, Althos Publishing, all pages, Aug. 16, 2006.*

*Primary Examiner* — James A Reagan
*Assistant Examiner* — Calvin Cheung
(74) *Attorney, Agent, or Firm* — Whitham, Curtis, Christofferson & Cook, P.C.

(57) ABSTRACT

A system and method for a user to log broadcast content at the time of the broadcast by selecting the content source on a device, the device having been configured to send the user's selection, date and timestamp, and a unique identification to a content server. The content server obtains a playlist of broadcast content from the content source, and uses the information from the user device to identify on the playlist the specific content selected by the user. The content server delivers the specific content to the user, by electronic mail or via a web page, together with associated content.

20 Claims, 4 Drawing Sheets

U.S. PATENT DOCUMENTS

| | | | |
|---|---|---|---|
| 2003/0220091 A1* | 11/2003 | Farrand et al. | 455/404.1 |
| 2004/0128514 A1* | 7/2004 | Rhoads | 713/176 |
| 2004/0254887 A1* | 12/2004 | Jacoby | 705/52 |
| 2004/0266336 A1* | 12/2004 | Patsiokas et al. | 455/3.04 |
| 2005/0027766 A1* | 2/2005 | Ben et al. | 708/300 |
| 2005/0071240 A1* | 3/2005 | Ewald | 705/26 |
| 2005/0086334 A1* | 4/2005 | Aaltonen et al. | 709/223 |
| 2005/0210101 A1* | 9/2005 | Janik | 709/203 |
| 2005/0210181 A1* | 9/2005 | Depke et al. | 711/100 |
| 2006/0004640 A1* | 1/2006 | Swierczek | 705/26 |
| 2006/0031551 A1* | 2/2006 | Agresta et al. | 709/231 |
| 2006/0062363 A1* | 3/2006 | Albrett | 379/101.01 |
| 2006/0095543 A1* | 5/2006 | Ito et al. | 709/218 |
| 2006/0141962 A1* | 6/2006 | Forbes et al. | 455/186.1 |
| 2006/0184960 A1* | 8/2006 | Horton et al. | 725/25 |
| 2006/0184977 A1* | 8/2006 | Mueller et al. | 725/86 |
| 2006/0235864 A1* | 10/2006 | Hotelling et al. | 707/101 |
| 2006/0268667 A1* | 11/2006 | Jellison et al. | 369/30.08 |
| 2008/0114480 A1* | 5/2008 | Harb | 700/94 |
| 2008/0147557 A1* | 6/2008 | Sheehy | 705/58 |
| 2008/0162300 A1* | 7/2008 | Ewald | 705/26 |

\* cited by examiner

SYSTEM AND METHOD FOR USER LOGGING OF AUDIO AND VIDEO BROADCAST CONTENT

This patent application claims priority from U.S. Provisional Application 60/732,153 filed Nov. 2, 2005 entitled "Methods and systems for real time logging of information received via a television or radio signal", which is incorporated herein by reference.

BACKGROUND OF THE INVENTION

1. Field of the Invention

The present invention generally relates to a system and a method for logging content heard on the radio or viewed on television, or other broadcast medium so as to be able to retrieve and recall specific pieces of information about that content at a later date.

2. Background Description

In today's world the typical consumer is bombarded by content from a variety of sources. This content can come in the form of a song, advertisement, entertainment programs or sporting events to name a few. At times a consumer may want to recall this content for processing at a later time. For example, a consumer may be driving down the road in their car and hear a song they like on the radio. They would like to be able to remember the title of that song when they get home so that they can download the song from their favorite music download site.

Another example would be that of a consumer again driving down the road in their car and they hear a commercial for a product they wish to buy. That commercial gives them a special telephone number to call or a website to visit. Again, the consumer would like to record the phone number or website so that they remember to go to that site the next time they are on the Internet.

In both examples the user would need to find a piece of paper and a pen or pencil somewhere in their car. Once they find these items they would then need to write down the song title, phone number or website in order to recall it later. They would need to find these items before forgetting the song title, phone number or web address. Finally, they would need to do all of this while driving down the road. This is a circus act that is not only difficult to do, but also unsafe for a person trying to drive a car.

In the prior art there is known a technique for using text-messaging to a radio station to bookmark a song being played and tag the song with descriptors reflecting user organization of the bookmarked songs. The user is able to browse the bookmarks by tag category, and can look at songs listed by others by tag category, in order to find selections to match any mood of the user.

However, this technique is promoted by a particular station and does not allow the user to choose a media source.

SUMMARY OF THE INVENTION

It is therefore the objective of the present invention to provide a system whereby the consumer can log content they hear on the radio or see on television, in accordance with the consumer's choice of media source, and without the need to write down the information.

It is a further objective of the invention to provide the user with a web site or email address where the logged content can be displayed and linked with additional associated content.

The invention includes an application (hereinafter the "Application") that records information associated with content heard or seen by the consumer. The Application may be run on any number of devices such as a mobile phone, PDA or any device (hereinafter "the Device") capable of accessing a central server, typically via the Internet, to record the source of the content and the date and time that the content was heard by the consumer.

The consumer begins the process by registering on a website. During the registration process the user records personal information in order to help establish a profile for the consumer. The consumer chooses a user-id and password that uniquely identifies them on the site. The consumer then selects the desired sources of content to associate with their profile.

The Application allows the consumer to associate keys on the Device with specific sources of content (hereinafter "Content Source") such as radio stations or television stations. At the time in which the consumer hears or sees content that they wish to log for further use, they simply press the key on the Device associated with the Content Source. The Application records the Content Source and the date and time that the button on the Device was pushed. The information thus recorded (hereinafter "Specific Content") is then sent by the Application to a central server (hereinafter "Content Server") on the Internet. This transmission of data can happen in real time if there is a persistent connection to the Internet available or in batch mode the next time the consumer connects the Device in such a way as to establish a connection to the Internet for the purpose of transmitting the data.

The Content Server contains a listing of the Content Sources and the metadata associated with all the content played by that source. The data being provided by the Device will be used to search this metadata in order to find a reference to the content that was heard or viewed by the consumer and recorded by the Device.

The information sent to the Content Server from the Device is associated with a unique user id (hereinafter "Unique Id") assigned to the consumer prior to logging any content. When the user logs on to this website (hereinafter "the Content Page") using their user name and password, the information found as a result of searching the metadata on the Content Server is displayed to them.

Finally, the invention provides for a method of linking the content displayed on the Content Page with associated content (hereinafter "Associated Content") found on the Internet. For example, a song displayed on the Content Page may have a link to the user's favorite music download site where they can download the song they heard on the radio. Another example would be a link to a web page put up by an advertiser tied directly to an ad they are playing on the radio.

One implementation of the invention is a method for logging broadcast content selected by a user. The method comprises obtaining a playlist from each of one or more content sources, each content source broadcasting content as described in the corresponding playlist; storing the playlist in a database controlled by a content server; receiving from a user device a selection of one of the content sources and a date and time of selection; and identifying from the playlist for the selected content source and the communicated date and time of selection a specific content being broadcast by the content source at the date and time of selection.

In a further aspect of the invention an application installed on the user device enables the user to assign each of one or more content sources to a unique selection action. The method may also involve delivering to the user the specific content corresponding to the selected content source and the communicated date and time of said selection and, in addition, assigning a unique ID to the user device, the unique ID enabling the content server to deliver specific content to the user.

In one implementation of the invention the specific content delivered is a playlist entry from a programming schedule. In another implementation the content server delivers to the user associated content as well as specific content. In a further implementation the associated content delivered to the user is a product purchase link obtained by the content server from an advertiser. Or the product purchase link can be generated by the content server without going to an advertiser. Further, an electronic mail message may be used to deliver specific content to the user. Or the specific content may be delivered the user via an Internet web page. In a further aspect of the invention, the user device may be a mobile telephone.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
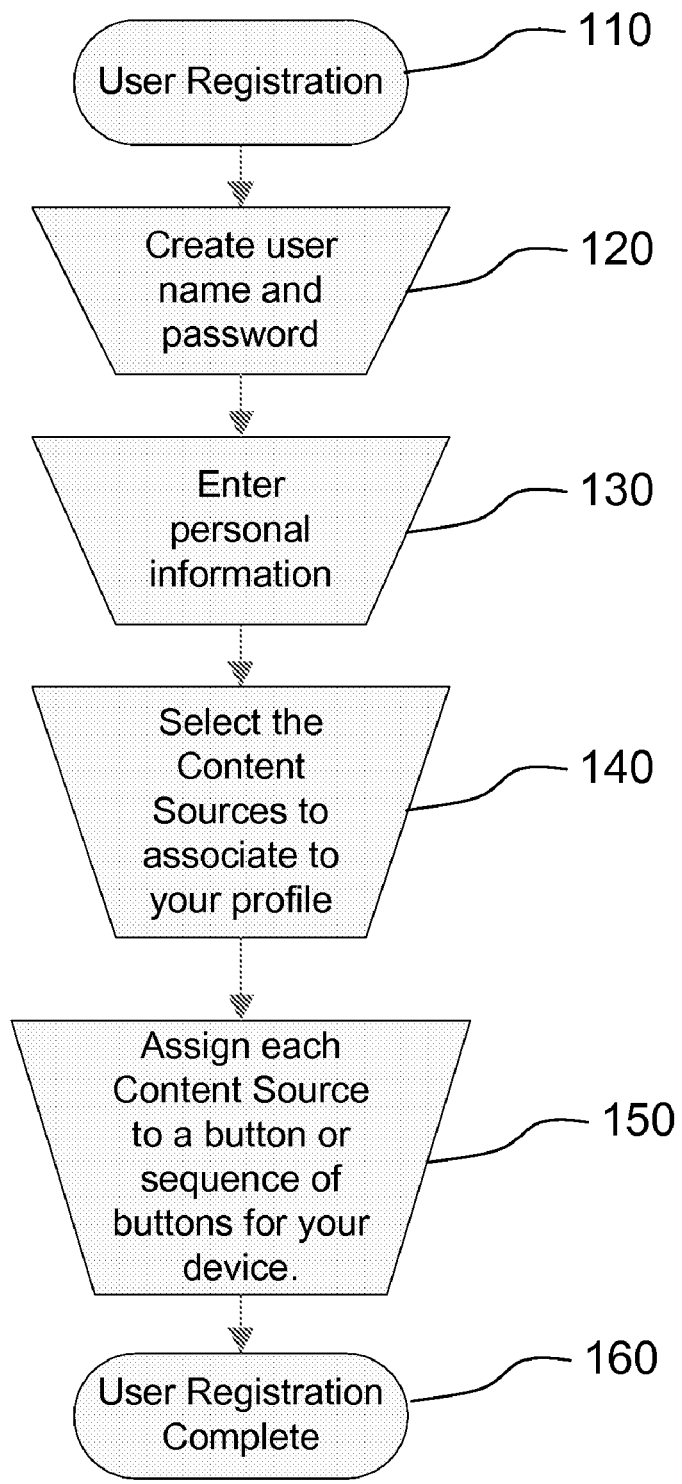
FIG. 1 is a representation of the process the user will go through to perform the initial setup and registration of the system.

Referring now to the drawings, and more particularly to FIG. 1, there is shown a diagram detailing the user registration process 110 for registering a user on the system. The user assigns themself a username id and password 120. A Unique ID is then assigned to the user. This is typically a mobile phone number, but any other system for providing a unique string of characters or symbols may be used. Additional information 130 is captured from the users including but not limited to items such as age and zip code. The user then selects the Content Sources 140 that the user may want to monitor for Specific Content. These are associated with the user's profile. Each Content Source is assigned 150 to a button or sequence of buttons on the Device being used to run the Application. The registration process is then complete 160.

Figure 2:
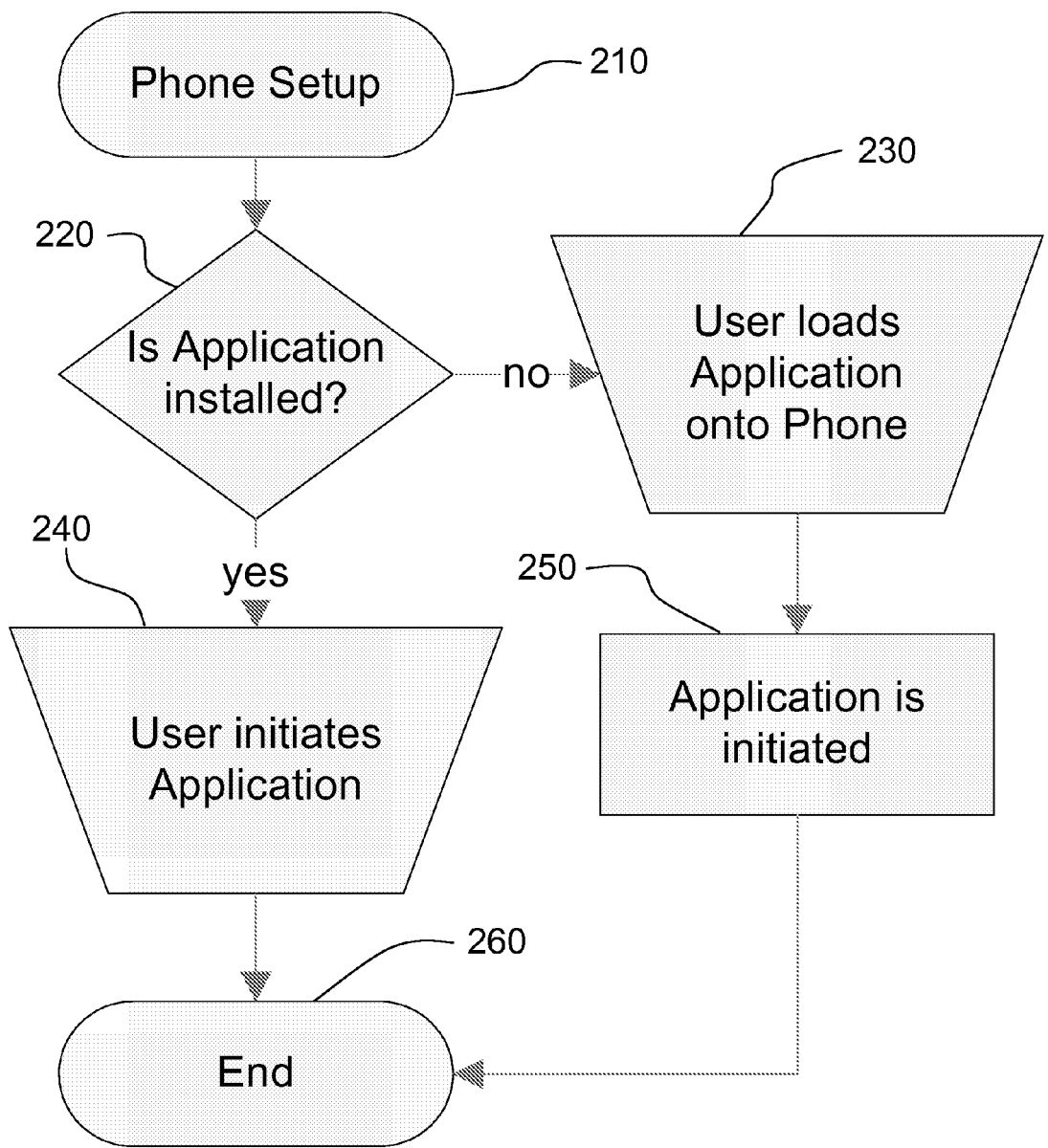
FIG. 2 is a representation of the process the user will go through to setup the Application on the phone.

The process used to setup the Application on the user's Device is shown in FIG. 2. In the example given, the Device is a phone 210. The user determines 220 whether the Application is installed on the Device. If the Application has been installed it is then initiated by the user 240. If the Application is not already installed on the Device, the user loads 230 and then initiates 250 the application, completing the setup 260.

Figure 3:
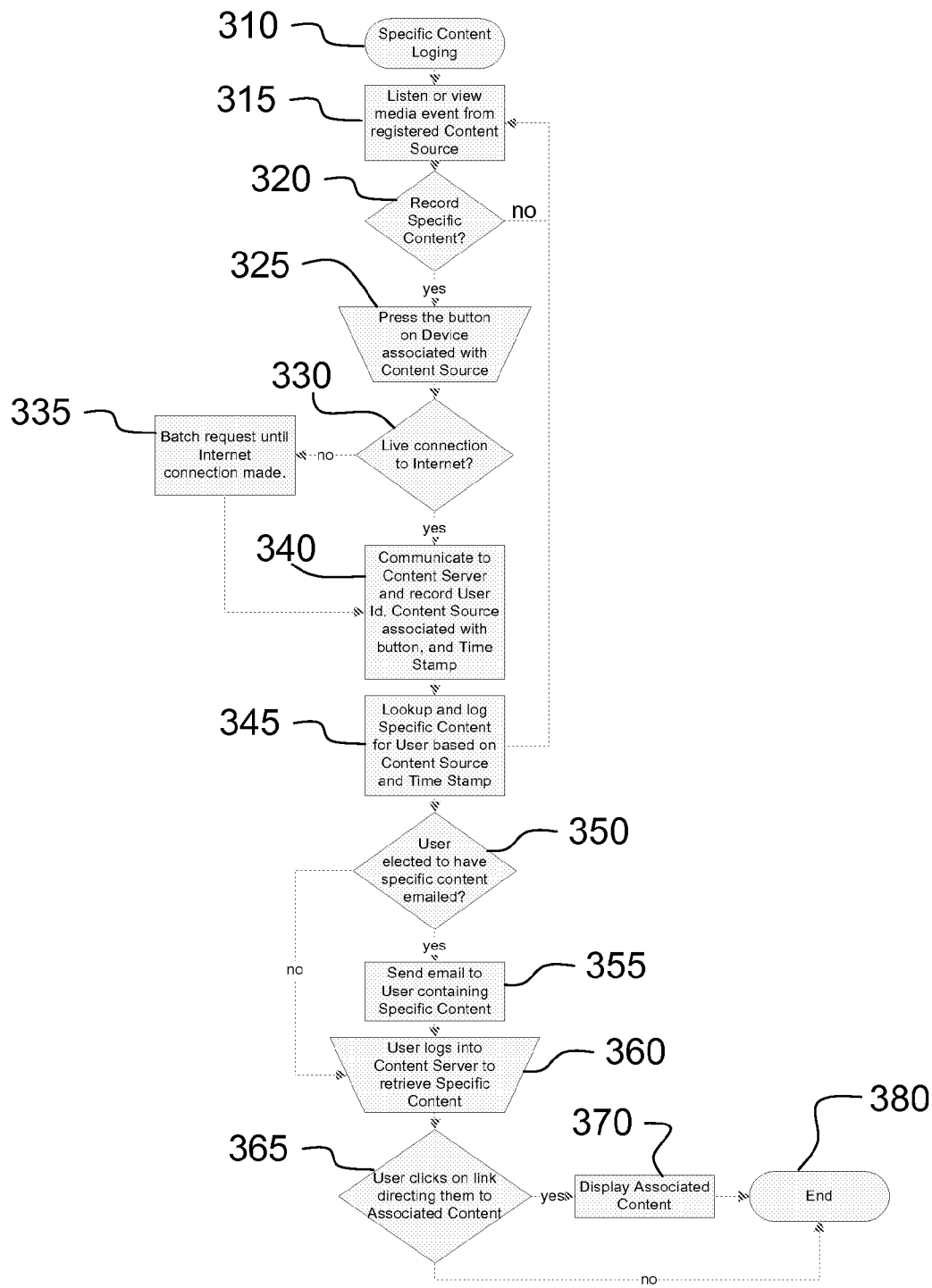
FIG. 3 is a representation of the process the user will go through when they wish to log content heard or viewed on the radio, television or other broadcast medium such as songs, ads, news or sporting events.

The Application supports the Specific Content logging 310 shown in FIG. 3. The user is in possession of the Device (e.g. phone 210) upon which the Application has been loaded and initiated as described in FIG. 2. Further, the user has registered as described in FIG. 1, including assignment of Content Sources to buttons on the Device. As those skilled in the art will appreciate, depending upon the characteristics of the Device's user interface, the assignment may take the form of a hardware button, a touch screen button or menu item, a combination of such buttons or menu items, either simultaneous or in sequence, a sound or sequence of sounds in a voice recognition system, or any other user interface protocol usable for assigning a Content Source to a unique selection action distinguishable from comparable assignments made to other and different Content Sources. For the purposes of describing the invention, the term "unique selection action" will be used to refer to any user action, in accordance with an interface protocol implemented on the Device, that is interpreted by the Application as user selection of a uniquely assigned Content Source.

In a typical circumstance the user is tuned to one of the user's registered Content Sources, listening to the radio or watching television or other broadcast medium 315. If they wish to record the Specific Content they are listening to or viewing 320, they press 325 the button or series of buttons on their Device corresponding to the Content Source. This causes the Application to create a record on the Device sufficient to enable the Content Server to identify the Specific Content being played at the time of pressing the button or buttons. Preferably, the identifying information is a date and time stamp together with an identifier for the Content Source. For a typical Device, such as a cell phone, the date and time is synchronized with a common clock, although other techniques may be used for synchronizing the Device date and time stamp with the clock on the Content Server. In one implementation of the invention, the Content Source may be identified by the corresponding button or buttons that have been pressed. Other schemes for identification of the Content Source will be apparent to those skilled in the art.

If the Device has a live connection 330 to the Internet, the identifying information is sent 340 to the Content Server, together with user identification information (i.e. Unique ID) registered at setup as described in FIG. 1. If the Device does not have a live connection to the Internet, the identifying information is stored 335 in the Device for a later batch transmission, along with user identification information, when an Internet connection is made. Those skilled in the art will also appreciate that communication methods other than the Internet may be used without departing from the spirit of the invention.

Once the identifying information for a record is received on the Content Server, this information will be used to look up and log 345 the Specific Content identified by the user. If, during the registration process, the user elected 350 to have the Specific Content emailed to them, an email containing the Specific Content and any Associated Content will be sent 355 to the user's email address. If the user has not chosen to have the Specific Content emailed to them they can log into the Content Server using their username and password as created during the registration process to access 360 Specific Content and Associated Content. If the Associated Content contains links to other locations, either for the purpose of providing additional information or to provide a link to a location to purchase the Specific Content, the user can choose to follow these links 365 to obtain display 370 of the Associated Content, after which the logging process comes to an end 380. And while a preferred implementation of the invention provides for electronic delivery, Specific Content and Associated Content may also be delivered in print form.

The Content Server is the focal point for Specific Content and Associated Content. Specific Content may be obtained by the Content Server from Content Sources known to the owner of the Content Server or identified by users in the registration process. In a typical scenario, a Content Source will have a programming schedule of its broadcast, including the date and time of each scheduled segment. For example, a radio station may have a playlist of songs broadcast and advertisements broadcast. Further, the playlist may be formatted to separately identify the title, the author, the performer and other data of interest to the user. For the purposes of describing the invention, the term "playlist" will be used to refer to any programming schedule that lists content segments being broadcast, whether the type of content is a song, an interview, a talk show segment, a television news segment, a segment of a sports event, an advertisement, or any other broadcast content. It is not necessary that a playlist be prepared in advance. For example, a playlist may be generated during the performance of a sports event, each individual play being a playlist entry.

In addition, Associated Content may be advantageously developed to further serve the users, the Content Sources, and the advertisers. If a user selects a song, the value of the service may be enhanced by providing the user with a link to a source for purchasing and downloading the song, and sources of more detailed information about the author of the song or the performer. Similarly, if the user selects a product advertisement, a link to the advertiser's web site for purchase of the product may be provided as Associated Content. Or if the user selects a segment of a talk show or news program, a link may be provided to a site where a podcast of the segment can be downloaded.

Figure 4:
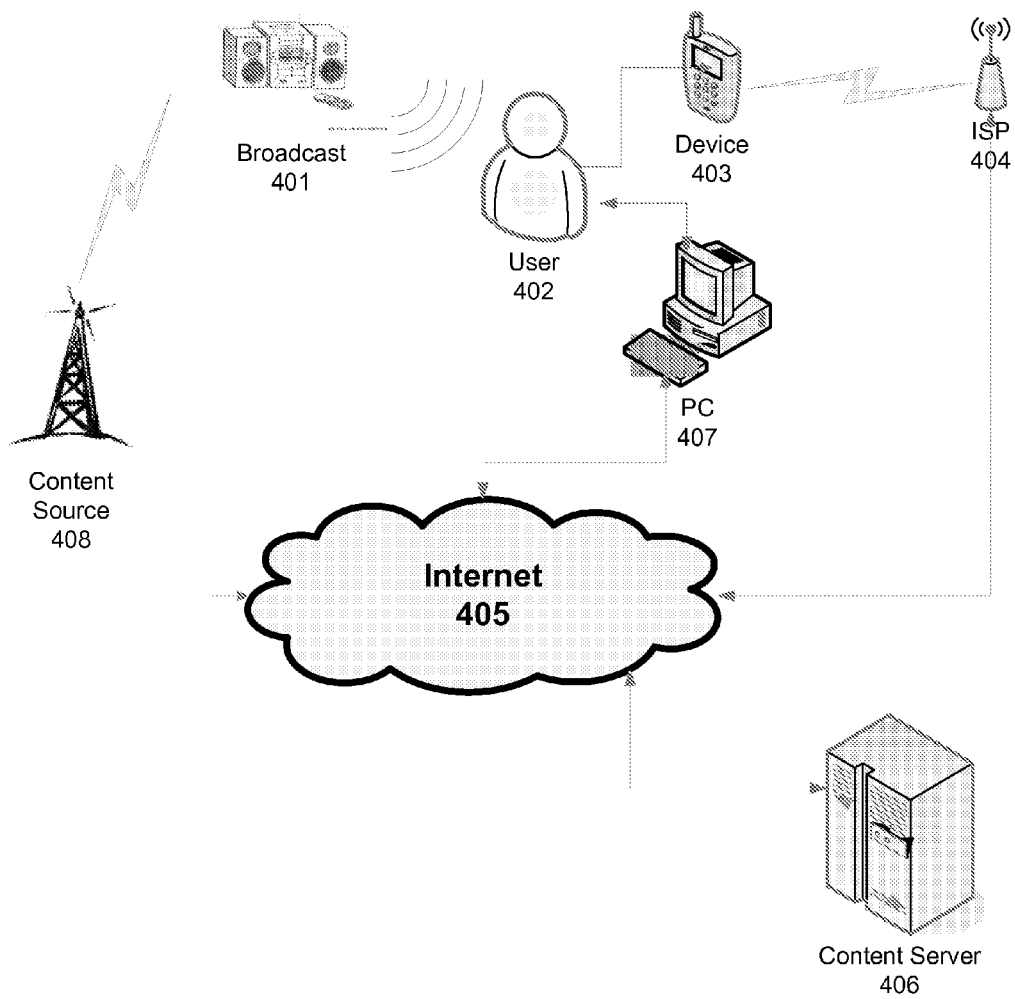
FIG. 4 is a diagram showing the various components for using the invention.

An overview of information flow in accordance with the invention is shown in FIG. 4. The explanation to follow assumes the user has been registered as in FIG. 1 and has installed the Application on the Device as in FIG. 2. The Content Source 408, typically a radio station or a TV station, provides a play list to the Content Server 406 detailing what is being broadcast and when. While listening or viewing a broadcast 401 from a Content Source 408, a user 402 may press the key(s) on their Device 403 associated in the user registration to the Content Source 408. The Application installed on the user Device 403 then records identifying information—e.g. the key(s) pressed and a time stamp when the key(s) were pressed. If a connection to the internet is available the identifying information, along with the Unique ID will be sent through a service provider 404 through the Internet 405 to the Content Server 406. The Specific Content corresponding to the identifying information is then determined by the Content Server 406, using the playlist earlier obtained from the Content Source 408. The user corresponding to the Unique ID is then able to access the Specific Content at the Content Server 406 over the Internet 405. The user's access may be via email sent by the Content Server 406 or via a web page served by the Content Server 406. This web page may be constructed and maintained automatically by an application program residing on the Content Server, using data element structures provided by playlists and associated metadata, and metadata from other sources. The user may access the email or the web page using a personal computer 407, as shown in FIG. 4, or another device. Those skilled in the art will appreciate that the user Device 403 may serve the function of personal computer 407 under appropriate configuration assumptions.

While the invention has been described in terms of a preferred embodiment, those skilled in the art will recognize that the invention can be practiced with modification within the spirit and scope of the appended claims.

The invention claimed is:

1. A system for real-time user logging of specific broadcast content, comprising:
   a content server for obtaining a playlist from each of one or more content sources, each content source broadcasting content as described by playlist entries in the corresponding playlist;
   a user device for connecting to the content server; and
   an application installed on the user device, the application providing a registration function, a real-time logging function, and a communicating function,
      the registration function enabling the user to register on the user device, as part of initiation of the application on the device, an association between a unique selection action of the user and a corresponding particular content source, the unique selection action being dependent upon, and in accordance with, an interface protocol implemented on the user device,
      the real-time logging function enabling the user to select the specific broadcast content by performing the corresponding unique selection action at a date and time when the specific broadcast content is being heard or seen by the user on the particular content source, and
      the communicating function of the application thereafter identifying the particular content source and the date and time of the selection to the content server;
   wherein the content server identifies from the playlist for the selected content source, using the communicated date and time of the selection, a playlist entry describing the specific broadcast content broadcasted by the content source at the date and time of the selection.

2. A system as in claim 1, wherein the content server delivers to the user the specific broadcast content corresponding to the selected content source and the communicated date and time of the selection.

3. A system as in claim 2, wherein the content server assigns a unique ID to the user device, the unique ID enabling the content server to deliver the specific broadcast content to the user.

4. A system as in claim 2, wherein the specific broadcast content delivered is a playlist entry from a programming schedule.

5. A system as in claim 2, wherein the content server delivers to the user associated content as well as specific content.

6. A system as in claim 5, wherein the associated content delivered to the user is a product purchase link.

7. A system as in claim 6, wherein the product purchase link is obtained by the content server from an advertiser.

8. A system as in claim 2, wherein the content server delivers the specific broadcast content via an electronic mail message.

9. A system as in claim 2, wherein the content server delivers the specific broadcast content via an Internet web page.

10. A system as in claim 1, wherein the user device is a mobile telephone.

11. A method for real-time logging of specific broadcast content selected by a user, comprising:
   obtaining a playlist from each of one or more content sources, each content source broadcasting content as described by playlist entries in the corresponding playlist;
   storing the playlist in a database controlled by a content server;
   registering on a user device an association between a unique selection action of the user and a corresponding particular content source for each of the content sources, the unique selection action being dependent upon, and in accordance with, an interface protocol implemented on the user device, thereby enabling the selection;

selecting by the user one of the content sources by performing the corresponding unique selection action at a date and time when the specific broadcast content is being heard or seen by the user on the selected content source;

receiving from the user device the date and time of the selection; and identifying from the playlist for the selected content source, using the received date and time of the selection, a playlist entry describing the specific broadcast content broadcasted by the content source at the date and time of the selection.

12. A method as in claim 11, further comprising delivering to the user the specific broadcast content corresponding to the selected content source and the received date and time of the selection.

13. A method as in claim 12, further comprising assigning a unique ID to the user device, the unique ID enabling the content server to deliver the specific broadcast content to the user.

14. A method as in claim 12, wherein the specific broadcast content delivered is a playlist entry from a programming schedule.

15. A method as in claim 12, wherein the content server delivers to the user associated content as well as specific content.

16. A method as in claim 15, wherein the associated content delivered to the user is a product purchase link.

17. A method as in claim 16, wherein the product purchase link is obtained from an advertiser.

18. A method as in claim 12, wherein an electronic mail message is used to deliver the specific broadcast content to the user.

19. A method as in claim 12, wherein an Internet web page is used to deliver the specific broadcast content to the user.

20. A method as in claim 11, wherein the user device is a mobile telephone.

\* \* \* \* \*